(No Model.)
J. M. ROBINSON.
CULTIVATOR.
No. 573,704.
3 Sheets—Sheet 2.
Patented Dec. 22, 1896.
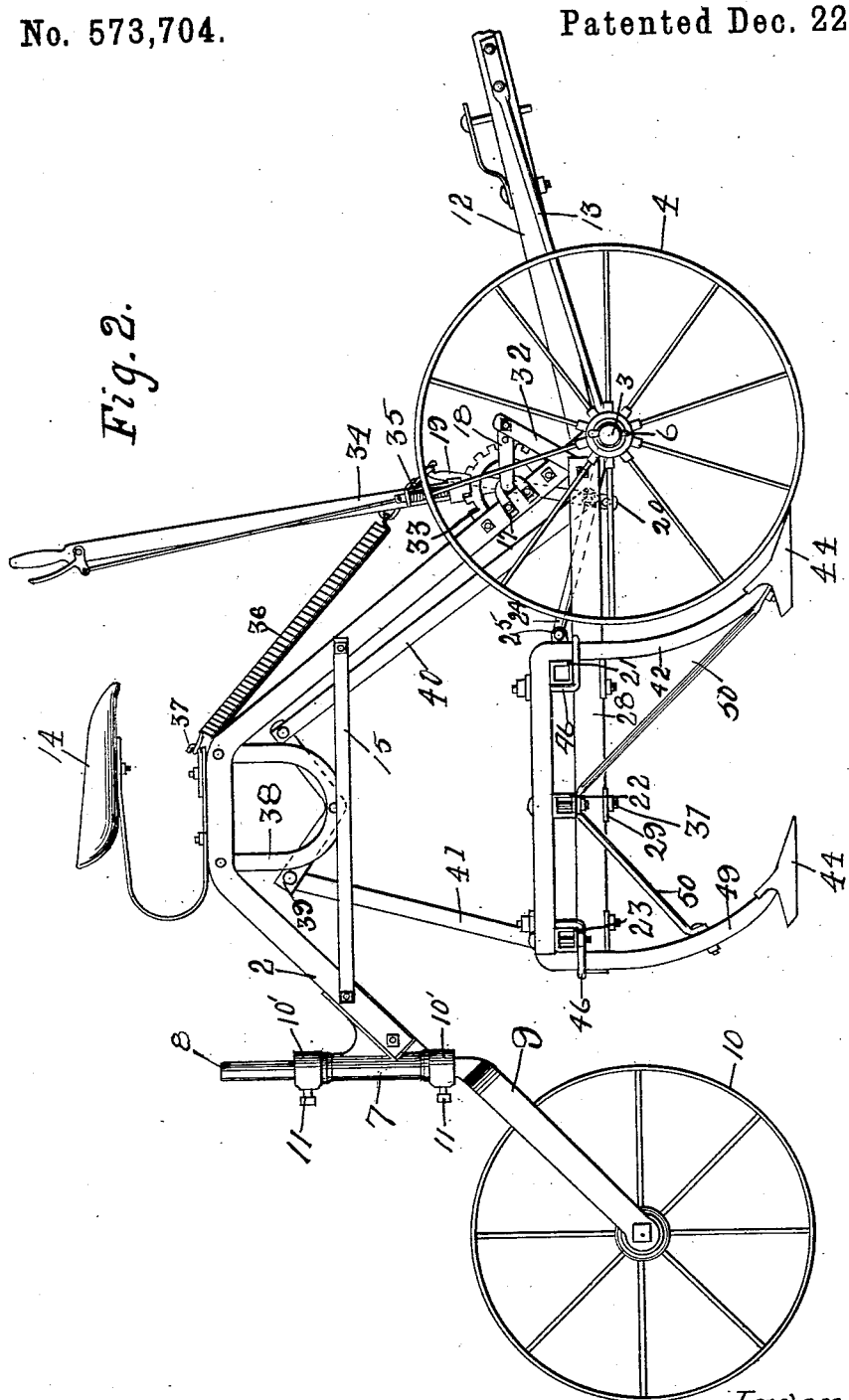
Witnesses
Richard Paul.
B. P. Shepherd
Inventor
John M. Robinson.
By Paul Hawley
his Attorneys

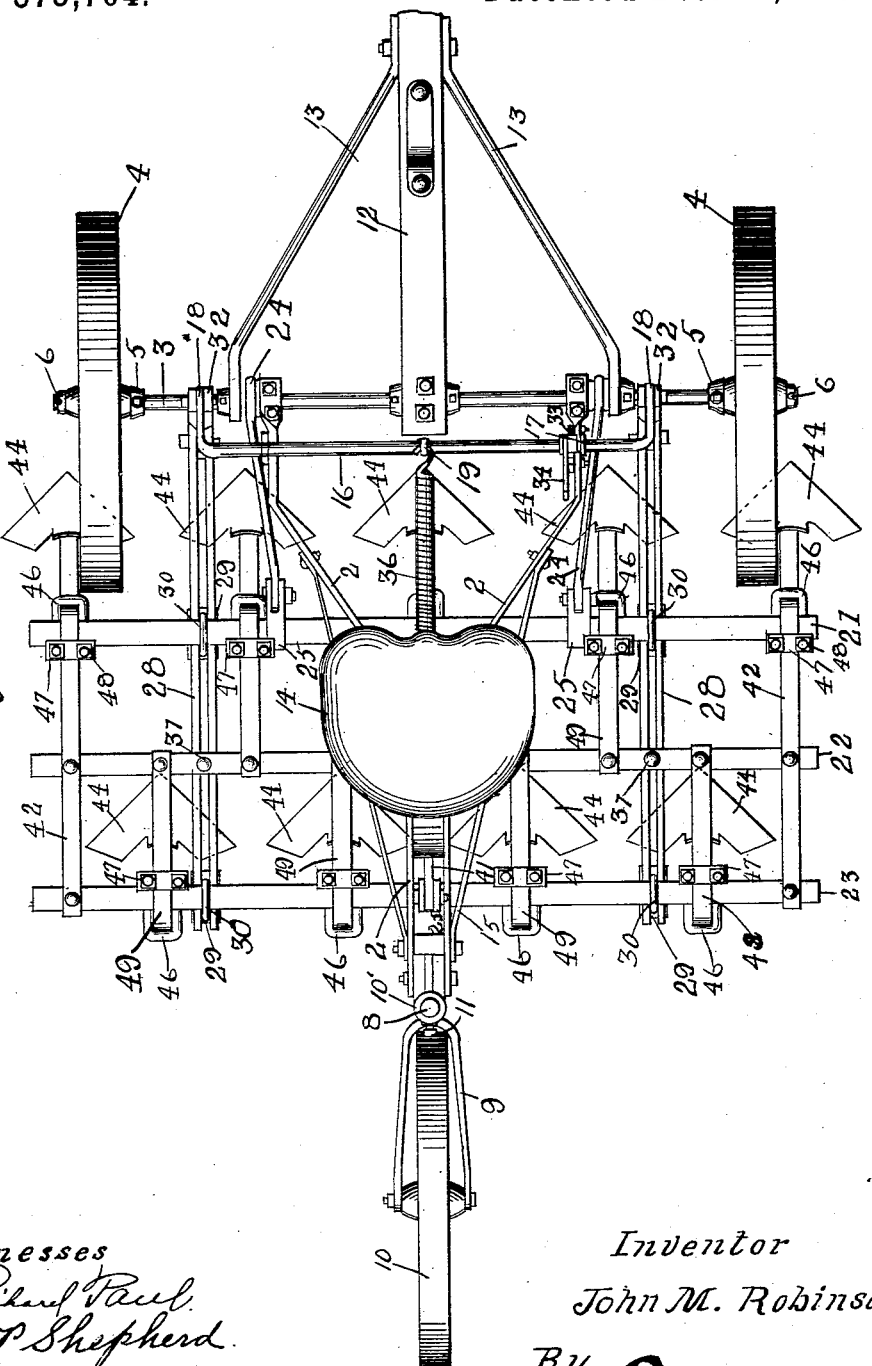

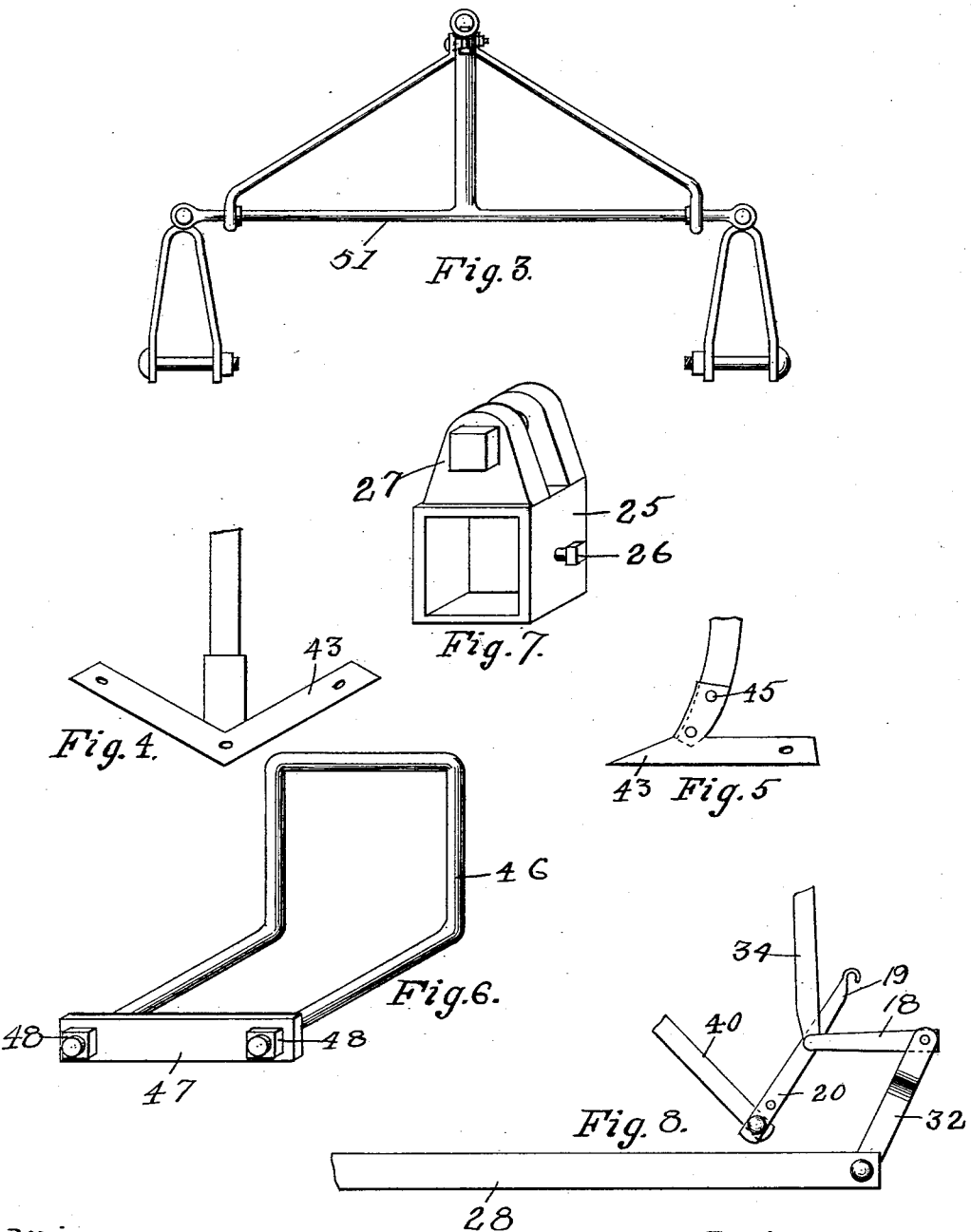

UNITED STATES PATENT OFFICE.

JOHN M. ROBINSON, OF BOZEMAN, MONTANA.

CULTIVATOR.

SPECIFICATION forming part of Letters Patent No. 573,704, dated December 22, 1896.

Application filed November 12, 1895. Serial No. 568,659. (No model.)

*To all whom it may concern:*

Be it known that I, JOHN M. ROBINSON, a citizen of the United States, residing at Bozeman, Gallatin county, Montana, have invented certain new and useful Improvements in Cultivators, of which the following is a specification.

My invention relates to that class of cultivators in which the teeth or plows are carried by a frame that is adapted to be raised or lowered by the movement of a lever; and the object of my invention is to provide a cultivator for killing the weeds, cutting them off as near the surface as possible, thereby rendering the machine of comparatively light draft, and, further, to provide a machine which will thoroughly pulverize the seed-bed, leave the surface comparatively level, and which will be extremely simple in its construction and operation.

A further object is to provide a cultivator which may be used to cultivate several rows at the same time, and, further, a cultivator having laterally-adjustable plows and supporting-wheels whereby the same is adapted for use between rows of different distances apart, and a still further object is to provide a construction to prevent breaking the plows when they strike an obstruction.

My invention consists, generally, in the combination, with a main frame provided with laterally-adjustable supporting-wheels, of a plow-frame connected thereto and adapted to be raised or lowered at will and provided with a series of plows which may be removed at will or arranged in a different position on the plow-frame, and being adapted to loosen up the soil and destroy all the weeds therein, all as hereinafter described, and particularly pointed out in the claims.

In the accompanying drawings, forming part of this specification, Figure 1 is a plan view of a cultivator embodying my invention. Fig. 2 is a side view thereof. Fig. 3 is a detail view of the mechanism for supporting two caster-wheels. Fig. 4 is a plan view of the plow-shoe. Fig. 5 is a side view thereof. Fig. 6 is a view of the clasp or clamp by which the plow-shanks are secured to the plow-frame. Fig. 7 is a view of the collar or block by means of which the link connecting the plow-frame and axle is attached to the plow-frame. Fig. 8 is a view of the tumbling-rod mechanism for raising and lowering the plow-frame.

In the drawings, 2 represents the main frame of the machine, made, preferably, of bar-iron curved or arched and having its forked forward end supported by the axle 3, having laterally-adjustable wheels 4, held in place on the axle by the slip-collars 5 and the linchpins 6. The wheels being adjustable may be set in any desired position on the axle. The rear end of the curved frame is provided with a long vertical socket 7 to receive a stud 8, provided on the fork 9, provided at its lower end with the caster-wheel 10, whereby the rear end of the curved frame is supported. The socket 7 is adapted to permit a swinging movement of the stud 8 therein, and collars 10', having set-screws 11, are provided on the stud 8 to limit the vertical movement of the stud within the socket and by means of which the rear of the curved frame may be raised or lowered, as desired.

A pole 12 is secured to the axle 3, being held in place by rods 13, having one end secured to the pole and the other to the axle just outside of the ends of the frame 2. A seat 14 is arranged upon the top of the curved frame 2, and the frame is braced upon each side by the bars 15, connecting the forward and rear portions of the frame. Arranged on the forward part of the curved frame parallel with the axle and just back of the same is the tumbling-rod 16, held in position on the frame by the loops 17 and provided with the bent ends 18 and the lugs 19 and 20, extending above and below the rod near the central portion thereof.

Beneath the curved frame in the rear of the tumbling-rod 16 is the plow-frame, composed of a series of square tubes 21, 22, and 23, (preferably three,) which support the plow-shanks and which may be raised or lowered at will, as hereinafter described. The forward tube 21 is connected to the axle 3 by links 24, having one end encircling the axle and the other connected to the collar 25, provided on the tube 21. These collars are adapted to slide on the tube 21, being held in position thereon by set-screws 26 and provided with lugs 27, between which the ends of the links 24 are pivotally supported by means of suitable bolts passing through the lugs.

At each end of the plow-frame outside of the links 24 I provide cross bars or beams 28, composed of two bars held together by castings 29, arranged on the under side thereof and supported and secured to the plow-frame by the loops or bands 30, which pass around the tubes 21 and 23, and by a bolt 31, which passes through the middle tube 22. The bars or beams 28 are bolted together at the forward end and pivotally connected with the bent ends 18 by links 32, as shown in Figs. 2 and 8.

Upon the inside of one of the forks of the frame 2 above the tumbling-rod 16 is a curved rack 33, and the tumbling-rod is provided upon its upper side near the rack with a lever 34, which extends up within reach of the driver and is provided with the usual spring-actuated catch or lock 35 for engaging the teeth of the rack. The lug 19, provided near the central portion of the tumbling-rod, has a hooked upper end to receive a link of the chain provided on the end of the spiral spring 36, the opposite end of which is secured to a hook 37 upon the upper side of the frame 2, beneath the seat 14.

A U-shaped part 38 is secured to the frame 2 beneath its highest part, and a bell-crank 39 is pivoted to the lower side of the U-shaped part and having one arm pivotally connected with the lug 20 by a bar 40 and its other arm pivotally connected with a collar 25, provided on the tube 23 by a link or arm 41. The arm 41 and the lug 20 are each provided with a series of openings by means of which the movement of the bell-crank and the plow-frame may be regulated.

Upon the upper side of the plow-frame, at each end thereof, I arrange the shanks 42, which extend entirely across the frame and curve downward at the forward edge of the tube 21 to a point near the surface of the ground. The lower end of the shanks is provided with the V-shaped shoe 43, to which the plowshare 44 is secured by bolts passing through openings provided in the shoe. To guard against breaking the plowshare, I provide an opening 45 in the shank to receive a break-pin, which will snap off should the plow strike an obstruction and allow the share to turn back out of the way of the obstruction. By providing the shoe on the lower end of the shanks I am able to use shares of different shapes and sizes, as desired.

The shanks 42 are secured to the tubes 21 and 23 by right-angled clasps 46, which pass around the shank and partially around the tube 21 and are clamped upon the upper side of the shanks by means of a plate 47 and nuts 48, as shown in Fig. 2. The middle portion of the shanks is secured to the tube 22 by a suitable bolt and the end to the tube 23 in a similar manner.

Arranged at intervals on the plow-frame between the shanks 42 are a series of similar but shorter shanks 49, those on the forward part of the frame being clamped to the tube 21 in the same manner as the shanks 42 and those on the rear portion being clamped to the tube 23, while the ends of both the forward and rear shanks are bolted at intervals to the middle tube 22. This tube is also provided with a series of openings, so that the position of the shanks, and consequently the plowshares, may be changed whenever desired. Suitable braces 50 are provided to connect the depending portions of the shanks 42 and 49 with the under side of the middle tube 22. These braces serve to hold the lower part of the shanks and the plowshares perfectly rigid at all times.

By substituting the caster-frame 51 shown in Fig. 3 for that shown in Figs. 1 and 2 I am able to straddle the rows and cultivate between several rows at a time.

It is obvious that the number of plows may be increased at any time by providing more holes in the middle tube 22.

From the preceding description it will be apparent that when the lever 34 is thrown back the bell-crank 39 will be tilted and the rear end of the plow-frame raised, and at the same time the links 32, connecting the bent ends 18 of the tumbling-rod 16 with the bars 28, will raise them and the forward end of the plow-frame. In raising the plow-frame the operator is aided by the spring 36, which is arranged to be put under tension when the frame is dropped down to bring the plowshares into engagement with the surface of the ground. The bent ends of the tumbling-rod are also provided with a series of openings by means of which the throw of the bars 28 and the plow-frame may be regulated. The plows are adapted to run flat upon the ground and to make only a shallow furrow, and while I have shown only one form of plowshare I do not wish to limit myself in this respect, as I may employ plows of different shapes and sizes for different classes of work, and as nearly all the parts of the machine are adjustable it can be adapted for the various purposes for which it was designed with ease and despatch.

Having thus described my invention, I claim as new and desire to secure by Letters Patent—

1. In a machine of the class described, the combination, with the arched frame, of the plow-frame, the tumbling-rod provided with projecting lugs, the U-shaped part carried by said main frame, the bell-crank pivoted thereto, the links connecting the arms of said bell-crank respectively with said plow-frame and one of the lugs on said rod, a lever for rocking said tumbling-rod, and a spring connecting the other lug on said rod with said main frame for the purpose set forth.

2. In a machine of the class described, the combination with the wheeled frame, of the plow-frame, means for raising and lowering the same, the shanks secured to said plow-frame, the shoes provided at the lower end of said shanks the removable plowshares and the right-angled clasp or clamps for adjustably securing said shanks upon said plow-frame, substantially as described.

3. In a machine of the class described, the combination, with the arched frame, of the plow-frame arranged beneath the same, the plows carried by said plow-frame, the tumbling-rod carried on the forward end of said arched frame, the bars 28 provided upon said plow-frame, the links 32 connecting said bars with said tumbling-rod, said tumbling-rod being provided with oppositely-extending lugs 19 and 20, means connecting said lug 20 with the rear of said plow-frame, a lever for operating said tumbling-rod, and a spring 36 connecting said lug 19 with the upper portion of said arched frame, for the purpose set forth.

4. In a cultivator, the combination, with the wheeled frame, of the plow-frame, arranged beneath the same, said frame being rectangular in form and composed of parallel tubes, the right-angled plow-shanks secured to said frame, and having one end depending beneath the same, the plowshares provided on the lower end of said shanks, means for raising and lowering said frame, the bars 28 connecting said frame with the axle, and the clamps 30 for securing said bars to said plow-frame, substantially as described.

5. In a machine of the class described, the combination, with the main frame, of the vertically-movable plow-frame supported beneath the same, the tumbling-rod carried by said main frame and having its ends bent at substantially right angles to the main portion thereof, said rod being also provided with oppositely-extending lugs at or near its central portion, the bars 28 secured to said plow-frame, the links connecting said bars with the ends of said tumbling-rod, and a bell-crank mechanism connecting the rear of said plow-frame with one of the lugs upon said tumbling-rod, whereby when said rod is rocked said plow-frame will be raised or lowered, substantially as described.

In testimony whereof I have hereunto set my hand this 28th day of October, A. D. 1895.

JOHN M. ROBINSON.

In presence of—
  V. A. COCKRILL,
  THOMAS LEWIS.